United States Patent
Okuda et al.

(10) Patent No.: US 9,493,219 B2
(45) Date of Patent: Nov. 15, 2016

(54) ALARM DISPLAY DEVICE, INTEGRATED NAVIGATION SYSTEM INCLUDING THE SAME AND METHOD OF DISPLAYING ALARMS

(71) Applicant: Furuno Electric Co., Ltd., Nishinomiya (JP)

(72) Inventors: Masato Okuda, Nishinomiya (JP); Ryu Shimizutani, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/382,543

(22) PCT Filed: Feb. 18, 2013

(86) PCT No.: PCT/JP2013/053886
§ 371 (c)(1),
(2) Date: Sep. 2, 2014

(87) PCT Pub. No.: WO2013/132999
PCT Pub. Date: Sep. 12, 2013

(65) Prior Publication Data
US 2015/0314840 A1    Nov. 5, 2015

(30) Foreign Application Priority Data

Mar. 5, 2012   (JP) .................... 2012-047613

(51) Int. Cl.
*G08B 23/00* (2006.01)
*B63B 49/00* (2006.01)
(Continued)

(52) U.S. Cl.
CPC ............. *B63B 49/00* (2013.01); *G08G 3/00* (2013.01); *B63B 2201/00* (2013.01);
(Continued)

(58) Field of Classification Search
CPC ............. B63B 49/00; B63B 2201/00; B63B 2213/02; G05B 23/0272; G08B
(Continued)

(56) References Cited

U.S. PATENT DOCUMENTS 6,437,812 B1    8/2002  Giles et al.
8,059,010 B2 *  11/2011  Guazzelli ............. H04Q 9/00
                                                340/870.07
(Continued)

FOREIGN PATENT DOCUMENTS

JP         8339225 A    12/1996
JP      2000347724 A    12/2000
(Continued)

OTHER PUBLICATIONS

ISA Japanese Patent Office, International Search Report of PCT/JP2013/053886, May 21, 2013, 4 pages.
(Continued)

*Primary Examiner* — Hung T Nguyen
(74) *Attorney, Agent, or Firm* — Alleman Hall McCoy Russell & Tuttle LLP

(57) ABSTRACT

A ship alarm display device that displays a plurality of sets of alarm information to be easily understood is provided. An alarm information acquiring module acquires the alarm information from apparatuses installed in a ship. A transmission source classification list memory stores transmission source classification lists obtained by associating each apparatus with a transmission source category. An importance list memory stores importance lists obtained by associating the alarm information with a level of importance. A display target specifying module specifies the transmission category and the level of importance as a display target. An information selecting module selects the alarm information corresponding to the specified display target from the plu-
(Continued)

rality of sets of alarm information stored in memory, based on the transmission source classification lists and the importance lists. An alarm information displaying module displays only the selected alarm information in a list, on a display unit.

20 Claims, 8 Drawing Sheets

(51) Int. Cl.
*G08G 3/00* (2006.01)
*G08G 5/00* (2006.01)
*G05B 23/02* (2006.01)

(52) U.S. Cl.
CPC ........ *B63B 2213/00* (2013.01); *G05B 23/0272* (2013.01); *G08G 5/0021* (2013.01); *G08G 5/0052* (2013.01)

(58) Field of Classification Search
CPC .................. 21/088;G08B 21/08; G08B 23/00; G08B 29/188
USPC ....... 340/425.5, 984; 114/74 R, 382; 701/21, 701/124; 707/20, 22
See application file for complete search history.

(56) References Cited

U.S. PATENT DOCUMENTS

| | | | |
|---|---|---|---|
| 8,614,633 B1* | 12/2013 | Lear | G08B 29/188 114/382 |
| 2002/0055790 A1 | 5/2002 | Havekost | |
| 2003/0016130 A1* | 1/2003 | Joao | B60R 25/102 340/539.1 |
| 2007/0172018 A1 | 7/2007 | Murayama et al. | |
| 2010/0156654 A1 | 6/2010 | Bullemer et al. | |
| 2011/0163896 A1* | 7/2011 | Chinigo | G07C 5/085 340/945 |

FOREIGN PATENT DOCUMENTS

| | | |
|---|---|---|
| JP | 200358967 A | 2/2003 |
| JP | 2006228030 A | 8/2006 |
| KR | 1020100102081 A | 9/2010 |
| WO | 2008099646 A1 | 8/2008 |

OTHER PUBLICATIONS

ANNEX 30 IMO Resolution MSC. 252(83), Retreived at http://www.imo.org/blast/blastDataHelper.asp?data_id=20469&filename=252(83).pdf, Adopted Oct. 8, 2007, 49 pages.
ANNEX 30 IMO Resolution MSC. 302(87), Retreived at http://www.imo.org/blast/blastDataHelper.asp?data_id=29324&filename=302(87).pdf, Adopted May 17, 2010, 49 pages.
European Patent Office, Extended European Search Report Issued in European Patent Application No. 13757620.3, Sep. 30, 2015, 11 pages.
Maritime Safety Committee, "Adoption of Performance Standards for Bridge Alert Management," Resolution MSC.302(87), Annex 21, Adopted May 17, 2010, 18 pages.
International Electrochemical Commission, "Maritime Navigation and Radio Communication Equipment and Systems—Part 2: Modular Structure for INS—Operational and Performance Requirements, Methods of Testing, and Required Test Results," IEC 61924-2:2012, Dec. 5, 2012, 3 pages. (Abstract Only—Submission of full locument prohibited by copyright license; USPTO encouraged to obtain its own copy).

* cited by examiner

FIG. 2

| | |
|---|---|
| ⚠ | UNSOLVED AND UNACKNOWLEDGED ALARM |
| △ | UNSOLVED AND ACKNOWLEDGED ALARM |
| ⚠? | SOLVED AND UNACKNOWLEDGED ALARM |
| ! | UNSOLVED AND UNACKNOWLEDGED WARNING |
| ✓ | UNSOLVED AND ACKNOWLEDGED WARNING |
| ? | SOLVED AND UNACKNOWLEDGED WARNING |
| ! | UNACKNOWLEDGED CAUTION |

FIG. 4

| Priority | Alert Text | Source | Occurred Time | ACK Time | Rectified Time |
|---|---|---|---|---|---|
| Alarm | Failure or Reduction in Power Supply | ECDIS 1 | 11:59 03 May 2011 | 11:59 03 May 2011 | 11:59 03 May 2011 |
| Alarm | No.1 S/G Control Power Fail | RADAR 2 | 11:59 03 May 2011 | 11:59 03 May 2011 | 11:59 03 May 2011 |
| Alarm | No.2 S/G Control Power Fail | ECDIS 2 | 11:59 03 May 2011 | 11:59 03 May 2011 | 11:59 03 May 2011 |
| Alarm | No.3 S/G Control Power Fail | ECDIS 2 | 11:59 03 May 2011 | 11:59 03 May 2011 | 11:59 03 May 2011 |
| Alarm | No.1 Actuator Fail (Hyd Lock) | RADAR 1 | 11:59 03 May 2011 | 11:59 03 May 2011 | 11:59 03 May 2011 |
| Warning | No.2. Actuator Fail (Hyd Lock) | ECDIS 1 | 11:59 03 May 2011 | 11:59 03 May 2011 | 11:59 03 May 2011 |
| Warning | Autopilot Fail | RADAR 2 | 11:59 03 May 2011 | 11:59 03 May 2011 | 11:59 03 May 2011 |
| Warning | No.3. Actuator Fail(Hyd Lock) | ECDIS 2 | 11:59 03 May 2011 | 11:59 03 May 2011 | 11:59 03 May 2011 |
| Warning | Emergency-01 CPU Fail | ECDIS 2 | 11:59 03 May 2011 | 11:59 03 May 2011 | 11:59 03 May 2011 |
| Warning | Emergency-03 Memory(ROM) Fail | RADAR 1 | 11:59 03 May 2011 | 11:59 03 May 2011 | 11:59 03 May 2011 |
| Warning | Emergency-04 Auto Rudder Output Fail | ECDIS 1 | 11:59 03 May 2011 | 11:59 03 May 2011 | 11:59 03 May 2011 |
| Caution | Emergency-05 Gyro Compass Input Fail | RADAR 2 | 11:59 03 May 2011 | 11:59 03 May 2011 | 11:59 03 May 2011 |
| Caution | Emergency-06 AUX Compass Input Fail | ECDIS 2 | 11:59 03 May 2011 | 11:59 03 May 2011 | 11:59 03 May 2011 |
| Caution | Emergency-07 1 Feed Back Fail | ECDIS 2 | 11:59 03 May 2011 | 11:59 03 May 2011 | 11:59 03 May 2011 |
| Caution | Emergency-08 2 Feed Back Fail | RADAR 1 | 11:59 03 May 2011 | 11:59 03 May 2011 | 11:59 03 May 2011 |

FIG. 5

ALARM DISPLAY DEVICE, INTEGRATED NAVIGATION SYSTEM INCLUDING THE SAME AND METHOD OF DISPLAYING ALARMS

TECHNICAL FIELD

This disclosure mainly relates to an alarm display device, which collectively displays alarm information outputted from various kinds of apparatus installed in a movable body, such as a ship.

BACKGROUND ART

Various kinds of apparatus and instruments provided to movable bodies, such as ships, output various alarm information as needed. Recently, alarm devices that handle this kind of alarm information collectively have been utilized. For example, alarm devices for ships are installed in bridges of the ships and receive the alarm information from various kinds of apparatus and instruments. When the alarm device receives the alarm information from the apparatuses and instruments, they inform people on board with visual and aural signals.

Various standards are determined for alarm devices for ships. In a resolution (hereinafter, simply be referred to as the standard) passed by MSC (Maritime Safety Committee) of IMO (International Maritime Organization) given in Non-patent Documents 1 and 2 for example, a detailed procedure for alarm devices to inform with visual and aural signals according to the importance (priority) of the alarm issued and a status thereof is requested. Many of the ship alarm devices nowadays are configured to match this standard.

REFERENCE DOCUMENTS OF CONVENTIONAL ART

Non-Patent Document(s)

Non-patent Document 1: "IMO RESOLUTION MSC. 252 (83)," pp. 23-32
Non-patent Document 2: "IMO RESOLUTION MSC. 302 (87)," pp. 6-8

DISCLOSURE OF THE INVENTION

Problems to be Solved by the Invention

However, in the above standard, for a situation where an alarm needs to be informed, what kind of means should be used to visually inform is not specifically regulated. Therefore, with alarm display devices for graphically displaying alarm information by using, for example, a liquid crystal display, there is a scope for a devise in a display mode of the alarm information.

Particularly, for example, when many alarms are issued at once, if the large amount of alarm information is displayed as it is, it will be difficult for an operator to understand, and there is a possibility that important alarm information is overlooked. Therefore, also when there is the large amount of alarm information to be displayed, it is desired to be able to display the alarm information in a manner that is easy to understand and satisfy the standard. However, with many of the currently known alarm display devices for ships, although the standard is satisfied, it is difficult to say that a sufficient study has been made in view of displaying the alarm information so that the operator easily understands.

This disclosure is made in view of the above situations and the purpose of this disclosure mainly relates to provide an alarm display device, which can display alarm information such that it can easily be understood.

SUMMARY AND EFFECT(S) OF THE INVENTION

Problems to be solved by this disclosure are described above, and means for solving the problems and effects thereof will be described below.

According to a first aspect of this disclosure, an alarm display device having a following configuration is provided. Specifically, the alarm display device includes a display unit, an alarm information acquiring module, a memory, a transmission source classification list memory, an importance list memory, a display target specifying module, an information selecting module, and an alarm information displaying module. The alarm information acquiring module acquires a plurality of sets of alarm information from respective apparatuses installed in a movable body. The memory stores the plurality of acquired sets of alarm information. The transmission source classification list memory stores transmission source classification lists obtained by associating each apparatus with one of a plurality of transmission source categories. The importance list memory stores importance lists obtained by associating each set of alarm information that is possibly transmitted from the apparatus, with one of a plurality of levels of importance. The display target specifying module specifies all or part of the plurality of transmission categories and the plurality of levels of importance as a display target. The information selecting module selects one or more sets of alarm information corresponding to the display target specified by the display target specifying module, from the plurality of sets of alarm information stored in the memory, based on the transmission source classification lists and the importance lists. The alarm information displaying module displays an alarm information list screen displaying only the selected one or more sets of alarm information in a list, on the display unit.

By extracting and displaying, in a list, only the one or more sets of alarm information specified as the display target as above, the alarm information can be displayed to be eye-friendly.

In the alarm display device described above, the display target specifying module preferably displays, on the display unit, a display target specifying interface for allowing an operator to specify the all or part of the plurality of transmission source categories and the plurality of levels of importance.

By this display target specifying interface, the operator can easily specify the display target.

In the alarm display device described above, the display target specifying interface is preferably displayed on the same screen as the alarm information list screen.

By displaying the display target specifying interface together with the alarm information lists screen on the same screen as above, the screen does not need to be switched for specifying the display target.

In the alarm display device described above, the plurality of levels of importance preferably include three levels. Moreover, the plurality of transmission source categories preferably include three kinds of a navigational electronic apparatus related kind, a communication apparatus related kind, and an engine room related kind.

Specifically, when the number of items that can be specified as the display target by the operator is excessive, it is troublesome to specify the display target, causing difficulty in switching the display target and the like. In this regard, when the number of the items which can be specified is about three, the operator can easily specify a desired display target.

In the alarm display device described above, a display resuming module is preferably provided, which is configured, after a predetermined period of time from the specification of the part of the plurality of transmission categories and the plurality of levels of importance as the display target, to return the state of the plurality of transmission categories and the plurality of levels of importance to a state in which all the plurality of transmission categories and the plurality of levels of importance are specified as the display target.

According to this, a situation in which the alarm information excluded from the display target is not displayed continues for a long period of time can be prevented, and therefore, the alarm information can surely be presented to the operator.

In the alarm display device described above, the number of sets of alarm information specified as the display target by the display target specifying interface is displayed near the display target specifying interface.

According to this, when the display target is specified by the display target specifying interface, the operator can predict in advance how much alarm information will be displayed on the alarm information list screen and therefore, the number of sets of the alarm information can serve as an indication when specifying the display target.

The alarm display device described above is preferably configured as follows. Specifically, this alarm display device includes an acknowledging user interface configured to allow an operator to input that the one or more sets of alarm information displayed on the alarm information list screen are acknowledged. The alarm information displaying module may remove the set of alarm information that is acknowledged and solved, from the alarm information list screen.

By not displaying the acknowledged and solved alarm information through the operator as above, it can be such that only the alarm information required to be informed to the operator can be displayed on the alarm information list screen. Thus, the alarm information list screen becomes more eye-friendly and the operator can easily grasp the alarm currently issued.

The alarm display device described above is preferably configured as follows. Specifically, this alarm display device includes a log selecting module and a log displaying module. The log selecting module selects the one or more sets of alarm information corresponding to the specified display target, from a plurality of sets of previous alarm information that are acknowledged and solved. The log displaying module displays, on the display unit, a log list screen displaying only the selected one or more sets of previous alarm information in a list.

Specifically, since an amount of the log of the previous alarm information (the acknowledged and solved alarm information) is massive, by only extracting and displaying, in a list, the log specified as the display target, the log can be displayed to be eye-friendly.

In the alarm display device described above, a collective acknowledging user interface is preferably provided, which allows, when a plurality of sets of alarm information that are unacknowledged but solved exist, the operator to collectively acknowledge the plurality of sets of solved alarm information.

Thus, when the plurality of sets of alarm information are already solved, they can collectively be "acknowledged" by a single operation by the operator. Therefore, even if a large amount of unacknowledged and solved alarm information remains, this can easily be deleted from the alarm information list screen.

In the alarm display device described above, a solution displaying module is preferably provided, which displays, when the set of alarm information is specified by predetermined operation of an operator, a solution of the set of alarm information on the display unit.

By displaying the solution of the alarm as above, the operator can be prompted to make a suitable response. Moreover, since the solution is displayed only for the set of alarm information specified by the operator, the space for displaying the solution can be minimized, and the display space for the alarm information list screen can be secured.

The alarm display device described above is preferably configured as follows. Specifically, solution display icons are associated with the respective sets of alarm information and displayed on the alarm information list screen. When the operator operates the solution display icon, the solution displaying module displays a solution of the alarm information corresponding to the icon.

Thus, the operator can easily display the solution of the desired alarm information by instinctive operation of operating the icons corresponding to the respective sets of alarm information.

In the alarm display device described above, the solution displaying module preferably displays the solution within the same screen as the alarm information list screen, in a predetermined area different from an area where the one or more sets of alarm information are displayed.

Since the area for displaying the solution is secured separately to the area where the alarm information is displayed as above, the browsability of the solution and the alarm information is not lost even when they are displayed simultaneously. Moreover, since the alarm information and the solution are displayed within the same screen, the solution can be browsed without switching the screen.

In the alarm display device described above, the solution displaying module may display the solution to popup.

By displaying the popup of the solution as above, the solution can be displayed only when needed.

The alarm display device described above is preferably configured as follows. Specifically, this alarm display device includes a conning information displaying module configured to display, on the display unit, a conning screen displaying at least a propulsion state of the movable body. Further, the conning information displaying module displays, in a partial area of the conning screen, the one or more sets of the alarm information that are sorted under a predetermined sorting condition fixedly determined, preferentially from the alarm information at the top in the sorted order.

Thus, the alarm display device of this disclosure can also function as a conning information display device. Moreover, since the space where the alarm information can be displayed on the conning screen is limited, the alarm information is sorted and displayed in the sorted order. Therefore, required alarm information can be displayed preferentially in the limited space. Moreover, since the sorting condition of the alarm information on the conning screen is fixed, for example, even if the sorting condition is changed on the alarm information list screen, the display mode of the alarm information on the conning screen is not influenced. Thus, the required alarm information can surely be displayed on the conning screen without receiving influence in its display mode on the alarm information list screen.

In the alarm display device described above, the sorting condition used by the conning information displaying module is preferably the order from the most important alarm information and the alarm information with the latest occurred time.

Thus, the alarm information that has high importance and is fresh can be displayed preferentially in the limited area of the conning screen.

According to a second aspect of this disclosure, an integrated navigation system including the alarm display device described above, a radar, and an ECDIS is provided.

According to a third aspect of this disclosure, a following method of displaying alarms is provided. Specifically, this alarm displaying method includes acquiring a plurality of sets of alarm information from respective apparatuses installed in a movable body, storing the plurality of acquired sets of alarm information, storing transmission source classification lists obtained by associating each apparatus with one of a plurality of transmission source categories, storing importance lists obtained by associating each set of alarm information that is possibly transmitted from the apparatus, with one of a plurality of levels of importance, specifying all or part of the plurality of transmission categories and the plurality of levels of importance as a display target, selecting one or more sets of alarm information corresponding to the display target specified by the specifying the all or part, from the plurality of sets of alarm information stored by the storing the plurality of acquired sets of alarm information, based on the transmission source classification lists and the importance lists, and displaying an alarm information list screen displaying only the selected one or more sets of alarm information in a list, on a display unit.

In the alarm displaying method described above, the plurality of levels of importance preferably include three levels. Moreover, the plurality of transmission source categories preferably include three kinds of a navigational electronic apparatus related kind, a communication apparatus related kind, and an engine room related kind.

BRIEF DESCRIPTION OF DRAWINGS

FIG. 2 is a view illustrating contents of an alarm information list screen.

FIG. 4 is a view illustrating meanings of alarm icons.

FIG. 5 is a view illustrating contents of a log list screen.

MODE(S) FOR CARRYING OUT THE INVENTION

Figure 1:
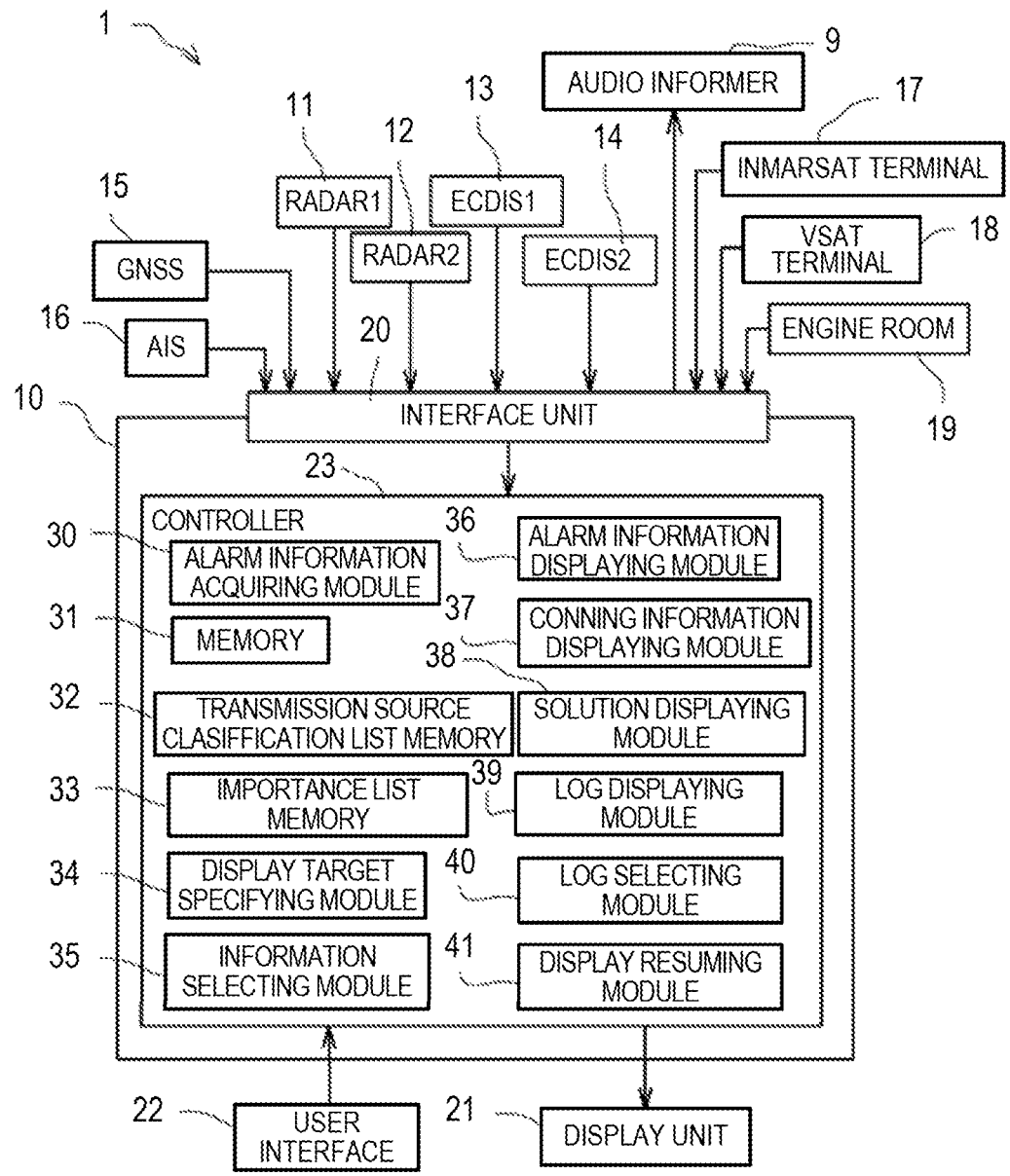
FIG. 1 is a block diagram illustrating an information display device according to one embodiment of this disclosure.

Next, one embodiment of this disclosure is described with reference to the drawings. FIG. 1 is a block diagram schematically illustrating functions of an information display device 10 according to one embodiment of this disclosure.

The information display device 10 constitutes a part of an INS (Integrated Navigation System) 1 provided in a ship, and displays various kinds of information regarding the ship. This INS 1 includes, besides the information display device 10 of this embodiment, radars 11 and 12 and ECDISs (Electronic Chart Display and Information Systems) 13 and 14, for example.

As illustrated in FIG. 1, the information display device 10 includes an interface unit 20, a display unit 21, a user interface 22, and a controller 23.

The interface unit 20 is connected with various kinds of apparatuses, and receives information from the apparatuses. Note that, in FIG. 2, the various kinds of apparatus are illustrated to be directly connected with the interface unit 20 for the sake of simple illustration; however, for example, the various kinds of apparatuses may be connected indirectly via a hub, and the connecting mode of each apparatus is not particularly limited. To sum up, the connecting mode is not particularly limited as long as the information display device 10 can appropriately receive the information outputted from each apparatus.

Although various kinds of apparatuses are connected with the interface unit 20, and to broadly classify, they can be classified into three kinds of categories of navigational electronic apparatus, communication apparatus, and other external input apparatus. Examples of the navigational electronic apparatus include the radars 11 and 12, the ECDISs 13 and 14, a GNSS (Global Navigation Satellite System) receiver 15, and an AIS (Automatic Identification System) 16. Examples of the communication apparatus include a communication terminal 17 utilizing Inmarsat (registered trademark), and a communication terminal 18 utilizing a VSAT (Very Small Aperture Terminal) system. Moreover, examples of the other external input apparatus include various kinds of sensors disposed in an engine room 19, such as an engine speed sensor, an oil temperature sensor.

The display unit 21 is, for example, a color liquid crystal display, and is capable of displaying graphically.

Although the user interface 22 is a mouse for an operator to control, it may be other pointing device, such as a trackball. Note that, the display unit 21 may be a touch panel display, and in this case, the display unit also functions as the user interface.

The controller 23 constitutes a computer comprised of hardware, such as a CPU, a ROM, and a RAM. Moreover, the RAM stores software, such as an information display program configured to control various kinds of configurations of the information display device 10. Further, by executing the information display program in the hardware, the controller 23 can function as, for example, an alarm information acquiring module 30, a memory 31, a transmission source classification list memory 32, an importance list memory 33, a display target specifying module 34, an information selecting module 35, an alarm information displaying module 36, a conning information displaying module 37, a solution displaying module 38, a log displaying module 39, a log selecting module 40, and a display resuming module 41. Note that, the various kinds of functions of the controller 23 will be described later.

The information display device 10 of this embodiment functions as an alarm display device configured to display alarm information originated from the various kinds of apparatuses provided to the ship. Moreover, this information display device 10 also functions as a conning information display device configured to display, in real time, instrument information indicating a propulsion state of the ship body and the like.

Figure 2:
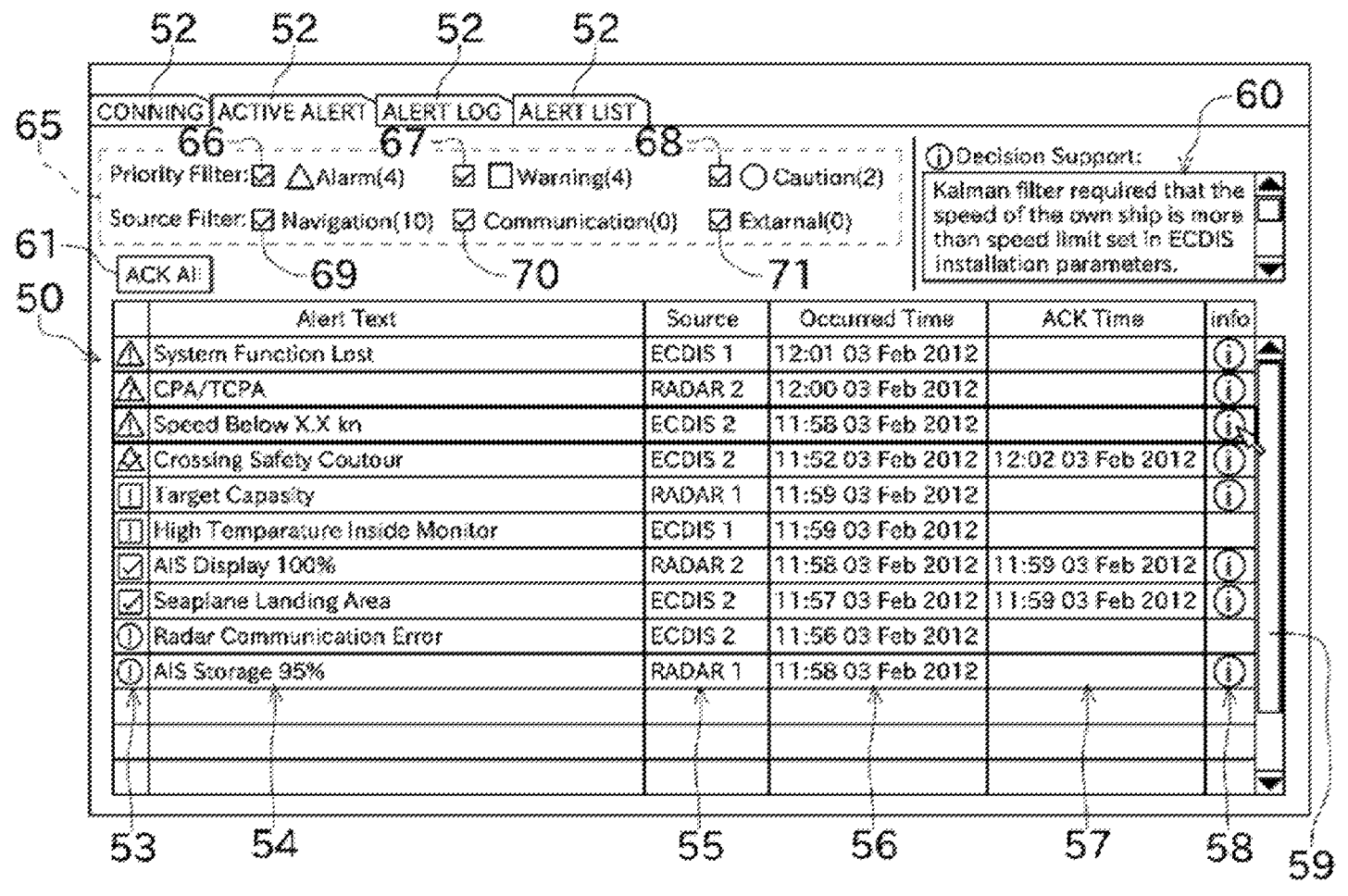

In the case where the information display device 10 functions as the alarm display device, the alarm information displaying module 36 of the information display device 10 performs a screen display. The alarm information display module 36 displays, on the display unit 21, an alarm information list screen 50 as illustrated in FIG. 2 based on the alarm information from the various kinds of apparatuses connected with the interface unit 20. On this alarm information list screen 50, the alarm information originated from the various kinds of apparatuses is displayed in the form of a list. The operator can view each set of alarm information in a list on this alarm information list screen 50.

Figure 3:
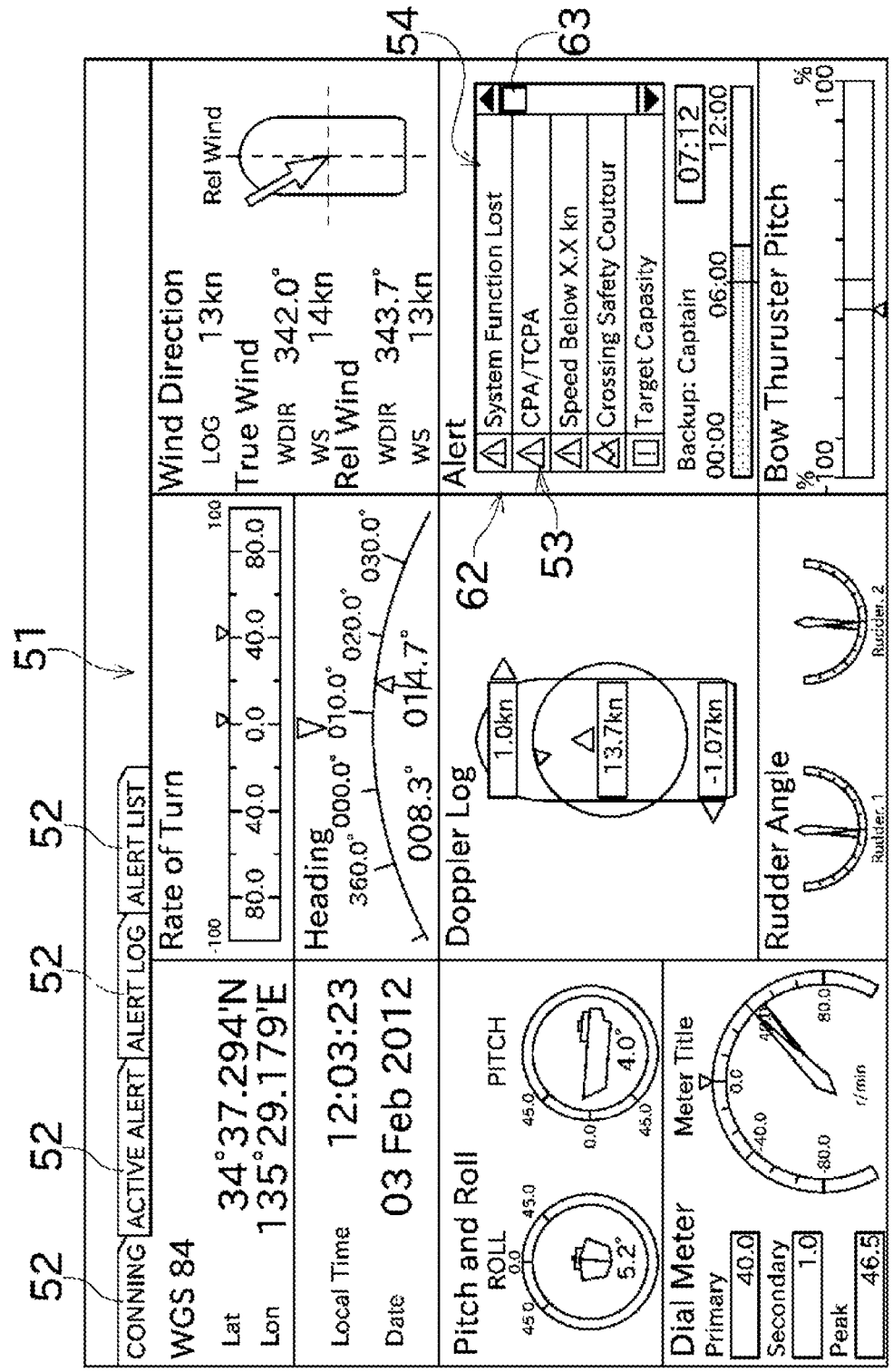
FIG. 3 is a view illustrating contents of a conning screen.

On the other hand, in the case where the information display device 10 functions as the conning information display device, the conning information displaying module 37 of the information display device 10 performs the screen display. The conning information displaying module 37 displays a conning screen 51 as illustrated in FIG. 3 on the display unit 21 based on information from the various kinds of apparatuses connected with the interface unit 20. On the conning screen 51, various kinds of information indicating the propulsion state of the ship, such as a course and a ship speed, is displayed graphically. The operator can accurately grasp the propulsion state of the ship by checking this conning screen 51.

The operator can switch the alarm information list screen 50 and the conning screen 51 therebetween by performing appropriate operation. For example, in this embodiment, tabs 52 configured to switch display contents are displayed in an upper part of the screen. The operator can switch the alarm information list screen 50 and the conning screen 51 therebetween as needed by operating these tabs 52.

Note that, the INS 1 of this embodiment also includes an audio informer 9. The audio informer 9 is, for example, a buzzer and configured to inform, when various kinds of alarms are issued, the issuance of the alarms to the operator by sound.

Next, the alarm information list screen 50 in FIG. 2 is briefly described. Each row of information displayed in a list on the alarm information list screen 50 corresponds to a single set of alarm information. The contents of each column of the list on the alarm information list screen 50 are, in the order from the left, an alarm icon 53, an alarm content text 54, a transmission source 55, an occurred time 56, an acknowledged time 57, and a solution displaying icon 58.

In the column of the alarm content text 54, texts plainly expressing the contents of the respective alarms are displayed. The operator can grasp the contents of the alarms currently issued by reading the display contents in the alarm content text 54.

The alarm icon 53 displayed on immediate left of the alarm content text 54 indicates importance of the each set of alarm information. Note that, in this specification, an icon means either one of an image and a figure having either one of a specific function and a specific meaning. The respective alarm icons 53 and the meanings thereof are illustrated in FIG. 4. Note that, the alarm icons 53 in the drawing are merely an illustration, and needless to say that icons in other fashion can suitably be adopted.

In this embodiment, the alarm information is classified into three levels of "Alarm," "Warning," and "Caution" in the order from the most important one. In "Alarm," alarm information that requires an urgent response is classified, and in this embodiment, it is displayed with a triangle alarm icon. In "Warning," alarm information that does not have urgency at a current point but has a possibility of raising a severe problem unless some sort of response is given is classified, and in this embodiment, it is displayed with a square alarm icon. In "Caution," alarm information that is not as severe as Alarm and Warning but requires attention is classified, and in this embodiment, it is displayed with a circular alarm icon.

Since the alarm icon 53 graphically indicating the importance of the alarm information is displayed adjacent to the alarm content text 54 of each set of alarm information as above, the operator can, at a glance, identify the importance of each set of alarm information by the alarm icon 53.

Moreover, the alarm icon 53 displays a status of each set of alarm information. Here, the status of each set of alarm information indicates whether the alarm information is "unacknowledged" or "acknowledged." In this embodiment, the alarm icon with an exclamation mark (!) indicates "unacknowledged" alarm information and the alarm icon with a check mark indicates the "acknowledged" alarm information. Note that, the meanings of the "unacknowledged" and "acknowledged" will be described later.

In the column of the transmission source 55, name(s) of the apparatus(es) from which the respective sets of alarm information are outputted (apparatus(es) with abnormality) are described. The operator can recognize the apparatus with abnormality by reading the transmission sources 55 of the respective sets of alarm information, and therefore, the operator can respond suitably to solve the abnormality.

In the column of the occurred time 56, time points at which the respective sets of alarm information are produced (i.e., time points at which abnormality occurred in the relevant apparatus) are described. In the column of the acknowledged time 57, time points at which the respective sets of alarm information are acknowledged by the operator are described. Note that, when the status of the alarm information is "unacknowledged," the column of the acknowledged time 57 is an empty column.

As described above, the information display device 10 displays the produced alarm information on the alarm information list screen 50 in the form of a list. Each row of the list corresponds to a single set of alarm information, and each set of alarm information is displayed, arranged from top down. By displaying the list of the alarm information as above, a large amount of alarm information can be displayed within a single screen with excellent browsability; however, if the alarm information cannot be held within the single screen, the operator can scroll the screen up and down by operating a scroll bar 59 displayed on the alarm information list screen 50, so as to display the alarm information which cannot be held within the screen.

Then, since the required information is described in the columns of each row of the alarm information list screen 50, the operator can easily grasp the contents of each set of alarm information. Moreover, on the alarm information list screen 50 of the information display device 10 of this embodiment, the operator can specify a sorting condition according to the contents of the respective columns so as to display the sorted alarm information. For example, the operator can perform predetermined operation to sort the alarm information in the order of importance and display it in a list, or sort the alarm information in the order of occurred time and display it in a list. Thus, the operator can display the alarm information in a manner that is easy to understand as needed.

Subsequently, operation of the INS 1 when abnormality occurs in each apparatus, is briefly described.

When some kind of abnormality occurs in each apparatus, the apparatus outputs predetermined alarm information. The outputted alarm information is inputted into the interface unit 20 of the information display device 10. The alarm information inputted into the information display device 10 is displayed in the form of a list on the alarm information list screen 50 in FIG. 2.

Moreover, simultaneously to this, the audio informer 9 emits an alarm sound. Thus, the alarm issuance can be informed by a visual and aural manner.

At the point where the alarm information is produced, the status of the alarm information is "unacknowledged." When the operator perceives the occurrence of abnormality by the display in the information display device 10 and the alarm sound from the audio informer 9, he/she performs the predetermined "acknowledge" operation. In this embodiment, the acknowledge operation is performed as follows. That is, the operator controls the user interface 22 to move the mouse pointer on the alarm information list screen 50 and hover the mouse pointer over the row of the "unacknowledged" alarm information. In this state, the operator performs click operation on a button of the mouse and the status of the relevant alarm information becomes "acknowledged." With the information display device 10 of this embodiment, the alarm information that should be acknowledged by the operator (the alarm information of which status is "unacknowledged") can easily be distinguished by the alarm icon 53 (i.e., the alarm information of which the alarm icon 53 is added with an exclamation mark may be "acknowledged"). Therefore, the operator does not wonder which alarm information to perform the "acknowledge" operation on. Note that, since the acknowledge operation of the alarm information can be performed by the control of the user interface 22 as described above, the user interface 22 can be said to be an acknowledging user interface.

When the status of the alarm information becomes "acknowledged," the alarm icon 53 changes and the time point at which the acknowledge operation is performed is described in the column of the acknowledged time 57.

When the statuses of all the sets of alarm information produced at the current point become "acknowledged" (when the all the sets of alarm information are acknowledged by the operator), the alarm sound from the audio informer 9 is stopped.

After acknowledging the alarm information, next, the operator makes a response to solve the abnormality which is the cause of the alarm. In this embodiment, the solution displaying module 38 of the information display device 10 displays the solution of the alarm information as needed.

Specifically, as illustrated in FIG. 2, a solution display area 60 is secured within the same screen as the alarm information list screen 50. The operator can perform the click operation on the solution display icon 58 displayed in a right end column of each set of alarm information. When the operator performs the click operation, the solution displaying module 38 displays, in the solution display area 60, a solution of the alarm information relating to the solution display icon 58 on which the operation is performed by the operator. According to this, the operator can make a suitable response according to the displayed solution.

Note that, since the kinds of the alarm information that can be transmitted from each apparatus is fixed, the solution of each kind of alarm information can be estimated in advance. Therefore, the content of the solution to be displayed in the solution display area 60 can be stored in the information display device 10 in advance for every kind of alarm information. When the solution display icon 58 is operated by the operator, among the solutions stored in the information display device 10 in advance, the solution displaying module 38 may select a relevant solution and display it in the solution display area 60. According to this, a suitable solution can easily be presented to the operator. Note that, depending on the kind of the alarm information, a solution thereof may not be stored in the information display device 10, and therefore, for such alarm information, the solution display icon 58 is not displayed.

As described above, in this embodiment, only for the alarm information specified through the operation on the solution display icon 58 by the operator, the solution is displayed. That is, for the alarm information for which the display of the solution is not required by the operator, the solution is not displayed. Since the unnecessary solution is not displayed as above, the solution display area 60 where the solution is displayed can be small, and a large area where the alarm information is displayed can be secured. Moreover, in this embodiment, as illustrated in FIG. 2, the solution display area 60 is within the same screen as the alarm information list screen 50 and also is set to be a different area from the area where the alarm information is displayed. Therefore, even when the solution is displayed, it does not interfere with the display of the alarm information; thus, the browsability of the alarm information does not degrade. Furthermore, since the solution and the alarm information are displayed within the same screen, for example, complicated operation of switching the screen to browse the solution is not required and all the information can be checked on a single screen.

When the operator makes the suitable response and the cause of the alarm is removed (when the abnormality of the apparatus is eliminated), the relevant alarm information becomes "solved." Note that, the alarm information of which the cause is not removed is referred to as the "unsolved" alarm information.

With the information display device 10 of this embodiment, the alarm information displaying module 36 deletes the alarm information which is "acknowledged" and "solved," from the alarm information list screen 50. Specifically, since these sets of alarm information are no longer required to be presented to the operator, there is no problem even if they are not displayed. Thus, it can be such that only the information required to be presented to the operator (the unacknowledged or unsolved alarm information) is displayed on the alarm information list screen 50; therefore, the operator can accurately grasp the required information and suitably respond to the abnormality of the apparatus.

Note that, since the alarm information of which importance is classified into "Caution" is displayed in purpose of issuing a warning against the operator, the response from the operator is not particularly required. Therefore, the alarm information classified in "Caution" is deleted from the alarm information list screen 50 once the operator performs the "acknowledge" operation.

Meanwhile, even the alarm information classified into either one of "Alarm" and "Warning" may be "solved" without requiring a special response from the operator. For example, when another ship abnormally approaches the ship, alarm information "CPA/TCPA" is produced, and when a distance between the other ship and the ship is increased sufficiently, this alarm information automatically becomes "solved" without particular response from the operator (note that, the CPA means a closest approach distance and the TCPA means a time length until the closest approach). Therefore, the alarm information may be "solved" before the operator performs the "acknowledge" operation. Note that in this embodiment, the alarm information which is "unacknowledged but solved" as above is displayed with the alarm icon 53 having a question mark (?).

For example, in a port that becomes crowded with ships, it is not rare that the other ship approaches to the ship. Therefore, in the port, the "CPA/TCPA" alarm is often issued. In addition, since the ship passes the other ship and yet another ship while it travels in the port, one after another, the produced "CPA/TCPA" alarm information becomes "solved." However, it can be considered that the operator does not perform such complicated operation that he/she performs the "acknowledge" operation on "CPA/TCPA" alarm information which is produced every time the ship passes the other ship, every time it is produced. As a result, a large amount of "unacknowledged but solved" alarm information is accumulated on the alarm information list screen 50.

Such "unacknowledged but solved" alarm information, despite that it no longer has a meaning to issue some kind of a warning against the operator, results in remaining on the alarm information list screen 50 until the "acknowledge" operation is performed by the operator. Thus, the information display device 10 of this embodiment has "a collectively-acknowledge button (collectively-acknowledging user interface) 61." Further, when the operator operates this collectively-acknowledge button 61, even in a case where a plurality of sets of "unacknowledged but solved" alarm information exist, the plurality of sets of alarm information are collectively changed to "acknowledged." According to this, the operator can collectively change the "unacknowledged but solved" alarm information to "acknowledged and solved" by only operating the collectively-acknowledge button 61; therefore, the alarm information can collectively be removed from the alarm information list screen 50.

Thus, the alarm information which is meaningless to present to the operator can all be removed from the alarm information list screen 50 to only leave the meaningful alarm information on the alarm information list screen 50, and therefore, the alarm information can be displayed to be eye-friendly. Moreover, for example, also in the case where the large amount of "unacknowledged but solved" alarm information is produced in the port which becomes crowded with ships, since such complicated operation that the large amount of alarm information is "acknowledged" one by one becomes unnecessary, the operator can focus on steering the ship and other work.

Note that, only the status of the "unacknowledged but solved" alarm information is changed to "acknowledged" by operating the collectively-acknowledge button 61 described above. Therefore, the statuses of the unsolved alarm information in "Alarm" and the unsolved alarm information in "Warning" are not changed even if the collectively-acknowledge button 61 is operated by the operator, because it is preferred that the operator explicitly performs the "acknowledge" operation since the "unsolved" alarm information requires a response from the operator. Moreover, since the purpose of the alarm information classified in "Caution" is to only issue a warning against the operator, there is no concept of "unsolved" and "solved" from the beginning Therefore, even if the acknowledge all button 61 is operated by the operator, the status of the alarm information classified in "Caution" is not changed and is left on the alarm information list screen 50 because, since the alarm information classified in "Caution" is for issuing the warning against the operator, it is not desirable to be removed from the alarm information list screen 50 without the explicit "acknowledge" operation by the operator.

Meanwhile, the information display device 10 of this embodiment can also be utilized as a conning information display device as described above. Since the conning screen 51 and the alarm information list screen 50 cannot be displayed simultaneously, the operator selects either one of them to be displayed on the display unit 21. However, when the conning screen 51 is displayed on the display unit 21, if the alarm information cannot be browsed unless the screen is switched into the alarm information list screen 50, the operator cannot promptly grasp the alarm information produced at the current point.

Therefore, as illustrated in FIG. 3, the conning information displaying module 37 of the information display device 10 of this embodiment can display the alarm information in an alarm display area 62 secured in a part of the conning screen 51. Since the alarm information can be displayed also on the conning screen 51 as above, the operator can view the alarm information while the conning screen 51 remains (without switching into the alarm information list screen 50).

However, since the conning screen 51 is configured to display mainly instrumental information, such as the propulsion state of the ship body, only a limited space can be assigned for the alarm display area 62. Thus, not all the information included on the alarm information list screen 50 can be displayed on the conning screen 51. Therefore, the conning information displaying module 37 of this embodiment only displays a part of the information displayed on the alarm information list screen 50, in the alarm display area 62 of the conning screen 51. Specifically, as illustrated in FIG. 3, only the alarm icon 53 and the alarm content text 54 are displayed for each set of the alarm information in the alarm display area 62 of the conning screen 51. That is, since the importance and status of each set of alarm information can be grasped with the alarm icon 53 and the contents of each set of alarm information can also be grasped with the alarm content text 54, even with only these two pieces of information, the purpose of presenting the alarm information to the operator can sufficiently be accomplished.

Moreover, with the information display device 10 of this embodiment, in the alarm display area 62 of the conning screen 51, the alarm information sorted in the order from the most important one and the one with the latest occurred time, is displayed as many as possible in the sorted order. In other words, in the alarm display area 62 of the conning screen 51, the alarm information that has higher importance and is fresher is displayed preferentially. According to this, the operator can surely browse the important alarm information on the conning screen 51. As described above, according to the configuration of this embodiment, the important alarm information can be presented effectively to the operator by utilizing the alarm display area 62 in a limited space on the conning screen 51. Note that, with the information display device 10 of this embodiment, a scroll bar 63 is provided in the alarm display area 62 of the conning screen 51, and therefore, the operator can also browse the alarm information with lower importance (or older occurred time) by operating the scroll bar 63.

Note that, as described above, through the specification of the sorting condition on the alarm information list screen 50 by the operator, the information display device 10 of this embodiment can sort and display the alarm information. On the other hand, in the alarm display area 62 of the conning screen 51, the sorting condition of the alarm information is fixed, and the sorting condition cannot be changed by the operator. In other words, in the alarm display area 62 of the conning screen 51, the alarm information that has higher importance and is fresher is always displayed preferentially.

According to this, since the latest alarm information with high importance can surely be presented in the alarm display area 62 in the limited space on the conning screen 51, it can be prevented that the operator overlooks the alarm information. On the other hand, on the alarm information list screen 50, since the focus is in presenting the alarm information to be eye-friendly to the operator, the sorting condition and the like can be changed as the operator prefers, and the display mode can be set flexibly. Thus, on the screen dedicated to display the alarm information (alarm information list screen 50), since the information can be browsed in a display mode as needed, the operator can effectively acknowledge the alarm information or solve the alarm information.

Note that, as described above, since the sorting condition is fixed in the alarm display area 62 of the conning screen 51, even if the sorting condition and the like are changed on the alarm information list screen 50 and the display mode of the alarm information is changed, the display mode of the alarm information in the alarm display area 62 of the conning screen 51 will not be influenced. For example, even if the sorting condition is set so that the alarm information is sorted in the order from the "least" important one in the alarm information list screen 50, the alarm information is always sorted and displayed in the order from the "most" important one in the alarm display area 62 of the conning screen 51.

Next, a log list screen 64 in FIG. 5 is briefly described. As described above, the information display device 10 of this embodiment removes the unnecessary alarm information (the acknowledged and solved alarm information) from the alarm information list screen 50. However, depending on the case, previous alarm information (the acknowledged and solved alarm information) removed from the alarm information list screen 50 may be desired to be browsed. Therefore, the information display device 10 of this embodiment is configured to be able to display a log of the previous alarm information.

Specifically, the log displaying module 39 of the information display device 10 displays, on the display unit 21, the log list screen 64 (FIG. 5) where the previous alarm information (the acknowledged and solved alarm information) is displayed in a list. The operator can operate the tab 52 displayed in the upper part of the screen to switch the screen into the log list screen 64. Thus, the previous alarm information can easily be browsed by the operator.

Subsequently, the information display device 10 of this embodiment is described in more details.

As described above, since the information display device 10 of this embodiment only displays the required alarm information in the list, the alarm information can be presented to be eye-friendly to the operator. However, if the large amount of alarm information is produced, since the state of the alarm information list screen 50 becomes a state in which the large amount of "unsolved" alarm information exists, the alarm information becomes less eye-friendly. Nonetheless, since the "unsolved" alarm information is information required to be presented to the operator, it cannot be removed from the alarm information list screen 50 as the "solved" alarm information. Therefore, with the above configuration only, the purpose of presenting the alarm information to be eye-friendly to the operator cannot be accomplished sufficiently.

Thus, the information display device 10 of this embodiment can filter the alarm information displayed on the alarm information list screen 50 through the operation by the operator. Specifically, the display target specifying module 34 of the information display device 10 displays a display target specifying check box group (display target specifying interface) 65 for specifying the alarm information to be displayed on the alarm information list screen 50 (hereinafter, simply be referred to as the display target), together with the alarm information within the same screen as the alarm information list screen 50 (FIG. 2). The operator can perform operation of checking or unchecking respective check boxes contained in the display target specifying check box group 65, by controlling the user interface 22.

As illustrated in FIG. 2, in this embodiment, the display target specifying check box group 65 includes an Alarm check box 66 for specifying the alarm information of which importance is "Alarm" as the display target, a Warning check box 67 where the alarm information of which importance is "Warning" is specified as the display target, and a Caution check box 68 where the alarm information of which importance is "Caution" is specified as the display target. Moreover, the display target specifying check box group 65 includes a Navigation check box 69 where the alarm information of which the category of the transmission source apparatus is "navigational electronic apparatus" is specified as the display target, a Communication check box 70 where the alarm information of which the category of the transmission source apparatus is "communication apparatus" is specified as the display target, and an External check box 71 where the alarm information of which the category of the transmission source apparatus is "external input apparatus" is specified as the display target.

The alarm information displaying module 36 of the information display device 10 only displays the alarm information specified as the display target in the display target specifying check box group 65 (the alarm information meeting a condition in which the check box corresponding thereto is checked) on the alarm information list screen 50. In other words, the alarm information which is not specified as the display target by the operator (the alarm information meeting a condition in which the check box corresponding thereto is unchecked) is filtered and no longer displayed on the alarm information list screen 50.

Figure 6:
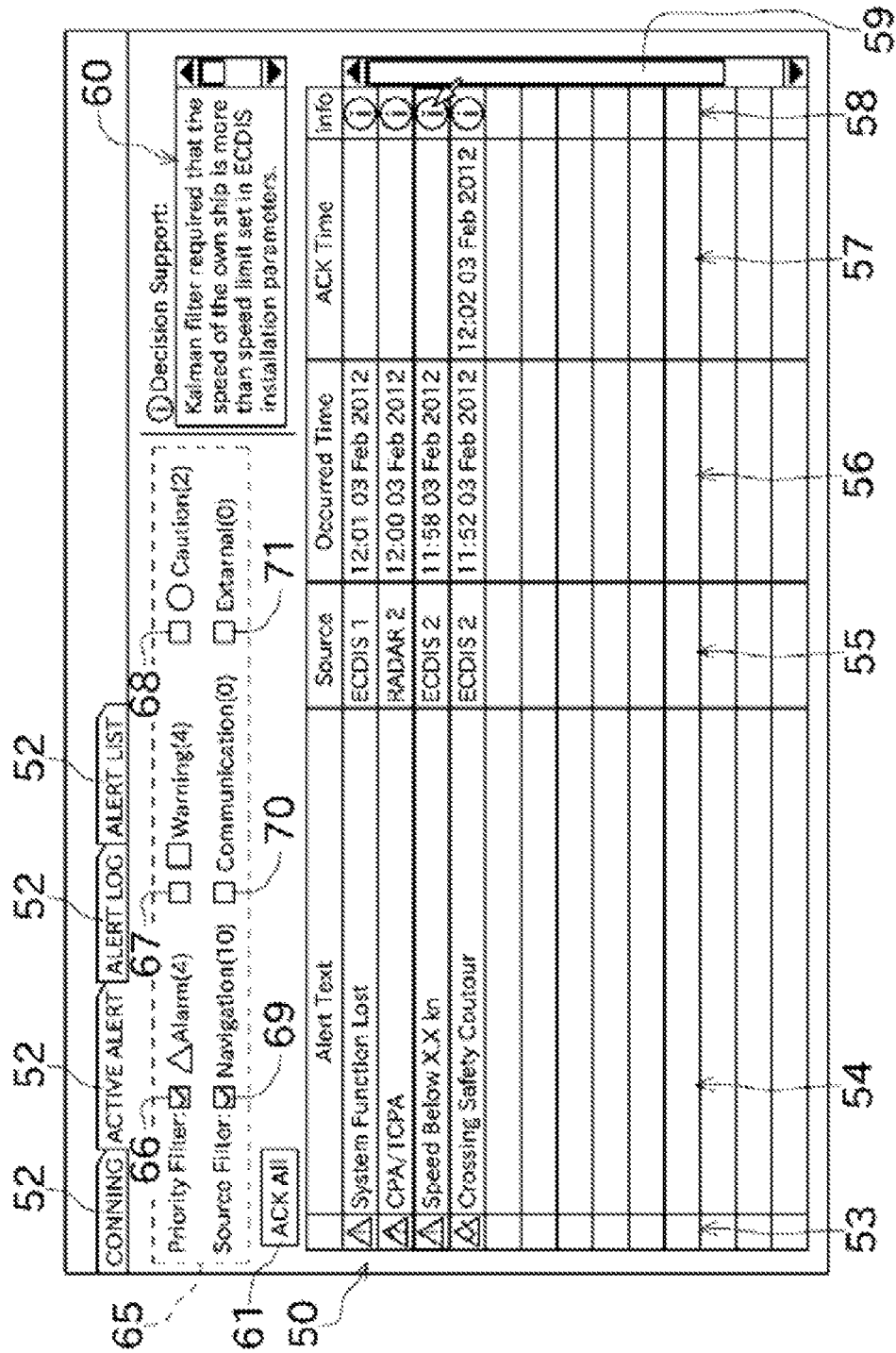
FIG. 6 is a view illustrating a situation in which a part of the alarm information is specified as a display target on an alarm information list screen.

For example, as illustrated in FIG. 6, the operator can check the Alarm check box 66 and the Navigation check box 69 and uncheck the other check boxes 67, 68, 70 and 71 to specify the display target such that "only Alarm relating to the navigational electronic apparatus is displayed." Further other than this, flexible setting, for example, "only Warning relating to the communication apparatus and the externally connected apparatus is displayed," is available. Thus, even when the large amount of alarm information exists, by filtering the alarm information to be displayed based on the specification by the operator, it can be such that only the alarm information required by the operator is displayed on the alarm information list screen 50. Therefore, the operator can browse the alarm information on the alarm information list screen 50 in a manner that is easy to understand, by specifying the display target as needed.

Note that, since the alarm information which is excluded from the display target by the operator (of which the check box is unchecked) is simply no longer displayed due to the filtering, when the check box is checked again by the operator (specified as the display target), the relevant alarm information is again displayed on the alarm information list screen 50.

Subsequently, the configuration for performing the filtering described above in the information display device 10 is described more in details.

As described above, the levels of importance of the alarm information include three levels of "Alarm," "Warning," and "Caution" in the order from the most important one. Thus, the display target specifying check box group 65 of this embodiment includes the three check boxes 66 to 68 where the importance of the display target is specified. Thus, the operator can specify all or part of the three levels of importance, as the display target.

Note that, since each apparatus outputs various kinds of alarm information, the level of the importance of each kind of alarm information is not always obvious. However, since the kinds of alarm information which may be outputted from each apparatus are fixed in advance, one of the three levels of importance can be set in advance for each kind of alarm information which can be outputted from each apparatus. Thus, the importance list memory 33 of the information display device 10 stores importance lists obtained by associating each kind of alarm information which can be outputted from each apparatus with one of the three levels of importance. Note that, the contents of the importance lists are preset at the time of factory shipment of the information display device 10 (importance list storing process).

Figure 7:
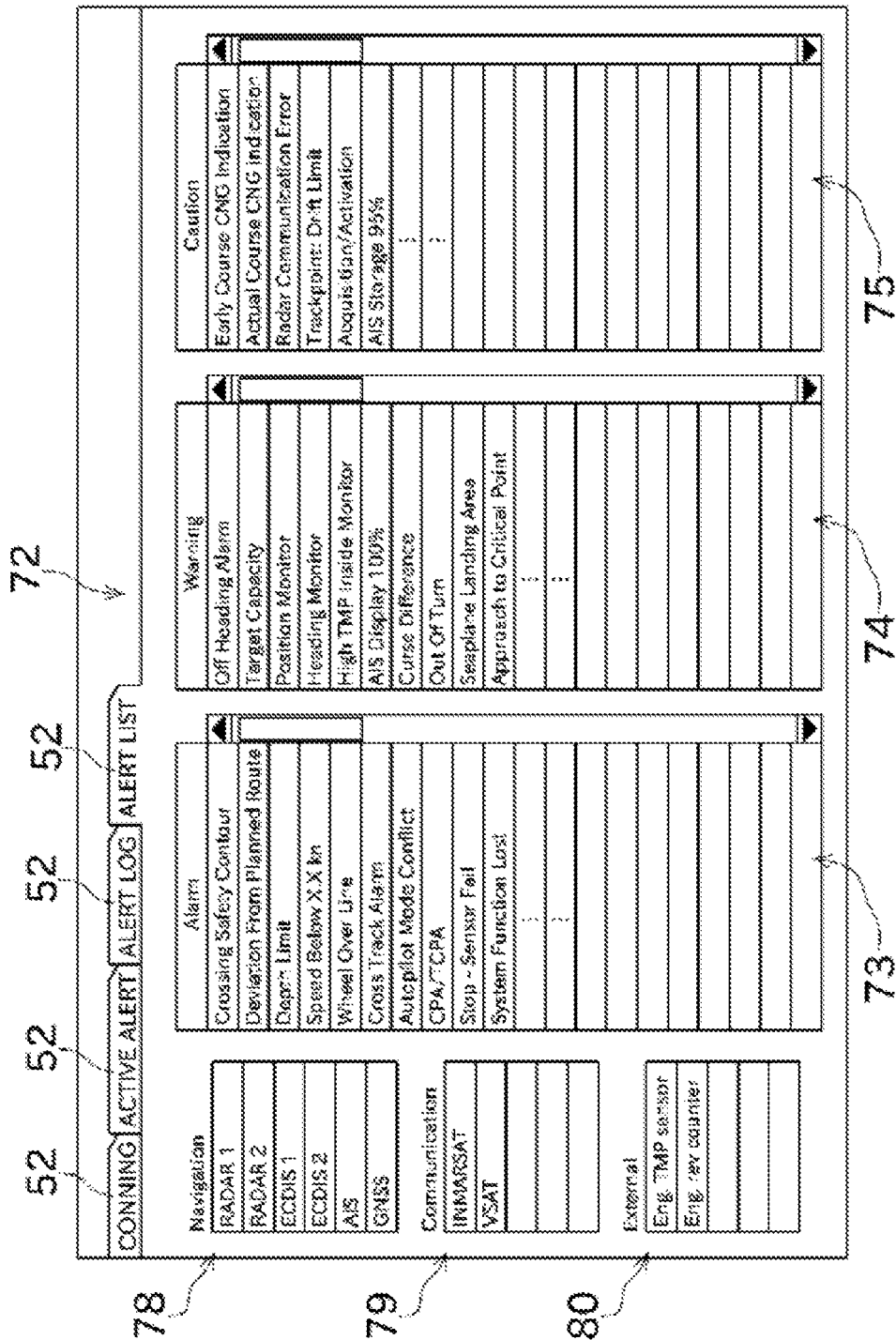
FIG. 7 is a view illustrating contents of an alarm list screen.

With the information display device 10 of this embodiment, the operator can check the contents of the importance lists on an alarm list screen 72 illustrated in FIG. 7. Specifically, an Alarm alarm information list 73 where the alarm information associated with the importance "Alarm" is listed up, a Warning alarm information list 74 where the alarm information associated with the importance "Warning" is listed up, and a Caution alarm information list 75 where the alarm information associated with the importance "Caution" is listed up, are displayed on the alarm list screen 72. Note that, the operator can operate the tab 52 displayed in the upper part of the screen to switch into the alarm list screen 72.

Since the contents of the alarm lists 73, 74 and 75 are preset as described above, the operator does not need to set the contents. However, the operator can change the registered contents of the alarm lists 73, 74 and 75 by performing suitable operation as needed. Thus, the operator can set the importance for each kind of alarm information, and therefore, the operator can flexibly customize the display mode of the alarm information as he/she prefers.

Moreover, as described above, the apparatuses connected with the interface unit 20 of the information display device 10 can be classified into the three kinds of the navigational electronic apparatus, the communication apparatus, and the other external input apparatus. Therefore, the transmission source of the alarm information displayed by the information display device 10 can be classified into one of the three categories (transmission source categories). Therefore, the display target specifying check box group 65 of this embodiment include the three check boxes 69 to 71 where the transmission source category of the display target is specified. Thus, the operator can specify all or part of the transmission categories classified into the three kinds, as the display target.

Note that, since there are various kinds of apparatuses which can be connected with the interface unit 20, which transmission source category each apparatus should be classified is not always obvious. Therefore, the transmission source classification list memory 32 of the information display device 10 stores transmission source classification lists obtained by associating each apparatus with one of the three kinds of transmission source category.

With the information display device 10 of this embodiment, the operator can check the contents of the transmission source classification lists on the alarm list screen 72 described above. Specifically, in the alarm list screen 72, a Navigation classification list 78 in which the apparatus(es) associated with the "navigational electronic apparatus" is listed up, a Communication classification list 79 in which the apparatus(es) associated with the "communication apparatus" are listed up, and an External classification list 80 in which the apparatus(es) associated with the "external input apparatus" are listed up. Note that, in this embodiment, since only an engine room instrument corresponds to the "external input apparatus" category, the "external input apparatus" category can also be said to substantially be an "engine room related" category.

The contents of the transmission source classification lists 78, 79 and 80 can be set by the operator. When a new apparatus is connected with the interface unit 20 of the information display device 10, the operator performs suitable operation on the alarm list screen 72 to register the new apparatus in one of the transmission source classification lists 78, 79 and 80 (transmission source classification list storing process). According to this, even when the new apparatus is added, the apparatus can be classified into the suitable transmission source category; however, a configuration in which when a new apparatus is added, the controller 23 automatically recognizes the category of the apparatus and registers it in one of the transmission source classification lists 78, 79 and 80 may be adopted.

Next, the operation of the information display device 10 when displaying the alarm information is described in detail.

When some sort of abnormality occurs with the apparatus connected with the interface unit 20 of the information display device 10, the apparatus outputs predetermined alarm information. The alarm information is inputted to the interface unit 20 of the information display device 10 and acquired by the alarm information acquiring module 30 of the information display device 10 (alarm information acquiring process). The memory 31 of the information display device 10 stores the alarm information acquired by the alarm information acquiring module 30 (storing process).

The operator suitably controls the user interface 22 to perform the operation of specifying the display target by using the display target specifying check box group 65 (display target specifying process). As described above, the display target specifying check box group 65 includes the check boxes 69 to 71 where the three kinds of transmission source categories are specified and the check boxes 66 to 68 where the three levels of importance are specified. Therefore, the operator can specify the display target among the three kinds of transmission sources and the three levels of importance.

Once the display target is specified by the operator, the information selecting module 35 of the information display device 10 extracts the alarm information corresponding to the importance and the transmission source category specified as the display target by the operator, from the stored contents in the memory 31 (information selecting process). Here, the information selecting module 35 determines the importance of each kind of alarm information stored in the memory 31, by referring to the importance lists stored in the importance list memory 33. Moreover, the information selecting module 35 determines the category of the transmission source apparatus (transmission source category) of each set of alarm information stored in the memory 31, by referring to the transmission source classification lists stored in the transmission source classification list memory 32. Further, the information selecting module 35 extracts the alarm information corresponding to the display target specified based on the determined information.

With the information display device 10 of this embodiment, since the importance lists and the transmission source classification lists are stored in advance as described above, the importance and the transmission source category of each set of the alarm information stored in the memory 31 can easily be determined. Therefore, the processing by the information selecting module 35, which is to extract the alarm information corresponding to the importance and the transmission category specified by the operator, can easily be performed.

Then, the alarm information displaying module 36 of the information display device 10 displays the alarm information extracted by the information selecting module 35, on the alarm information list screen 50 as a list (alarm information displaying process). With the method described above, it can be such that only the alarm information specified as the display target by the operator is displayed on the alarm information list screen 50.

Note that, it can also be considered to classify the importance or the transmission source category more finely (e.g., ten classifications). However, in this case, many check boxes where the display target is specified will be required, and therefore, the operator will have a tough time checking and unchecking the check boxes, and it becomes rather troublesome to gain a desired display result. In this regard, with the information display device 10 of this embodiment, since each of the importance and the transmission source category is organized into the three kinds, the operator can specify six kinds of display targets, and the number of check boxes is six. With such a number of check boxes, the operator can specify the desired display target quickly and it is instinctive and easy to understand. Therefore, the operator can easily gain the desired display result.

With the information display device 10 of this embodiment, as illustrated in FIG. 2, near the check boxes 66 to 71, the number of sets of alarm information which can be specified as the display target by the check boxes are displayed. For example, in the example of FIG. 2, a label of the Alarm check box 66 displays that the number of sets of alarm information corresponding to the importance "Alarm" is four. Moreover, for example, a label of the Navigation check box 69 displays that the number of sets of alarm information of which the transmission source category is classified into the "navigational electronic apparatus" is ten. The operator can estimate the number of kinds of alarm information displayed on the alarm information list screen 50 when each check box is checked (specified as the display target), by checking this number display. Therefore, based on the number display described above as an indication, the operator can specify the display target.

With the information display device 10 of this embodiment, as illustrated in FIG. 5, the filtering described above can be performed also on the log list screen 64. Specifically, the display target specifying check box group 65 is also displayed on the log list screen 64 so that the display target can be specified similarly to the alarm information list screen 50 (FIG. 2). When the operator specifies the display target in the display target specifying check box group 65 of the log list screen 64, the log selecting module 40 of the information display device 10 extracts the alarm information corresponding to the specified display target among the previous alarm information (the acknowledged and solved alarm information). Then, the log displaying module 39 only displays the alarm information extracted by the log selecting module 40, on the log list screen 64. Thus, also on the log list screen 64, the previous alarm information can be filtered based on the specification by the operator.

In other words, since the previous alarm information (the solved alarm information) accumulates as the navigation proceeds, the number of sets of alarm information displayed on the log list screen 64 becomes massive. Therefore, by filtering the displayed information and extracting only the required information to be displayed, the browsability of the log list screen 64 can significantly be improved.

Meanwhile, on the alarm information list screen 50, when the operator unchecks one of the check boxes 66 to 71 (when excluding from the display target), the alarm information meeting the condition of the relevant check box is filtered and is no longer displayed on the alarm information list screen 50 thereafter. However, in view of the original purpose as the alarm display device, it cannot be said as preferable that a situation in which the alarm information is not displayed continues for a long period of time even if it is the operation the operator desires.

Therefore, the display resuming module 41 of the information display device 10 of this embodiment, upon satisfying a predetermined condition, resumes from the situation in which the alarm information is not displayed back to a state in which all the three kinds of transmission source categories and the three levels of importance are specified as the display target on the alarm information list screen 50. Specifically, even when the check box is unchecked by the operator, upon satisfying a predetermined condition, such a state is forcibly returned back to the state in which all the six check boxes 66 to 71 of the alarm information list screen 50 are checked. Thus, when the predetermined condition is satisfied, the alarm information excluded from the display target due to the setting by the operator is also displayed on the alarm information list screen 50 again.

In this embodiment, the predetermined condition is "after a predetermined period of time from a specification of a part of the transmission category and the importance as the display target." Specifically, even when the operator performs the operation of unchecking the check box, after the predetermined time period from the operation, it returns back to the state in which all the check boxes are checked. Thus, it can be prevented that the state in which the non-displayed alarm information exists remains for a long period of time and the alarm information can surely be presented to the operator.

Subsequently, relation between the filtering and the collectively-acknowledge button 61 described above are described. With the information display device 10 of this embodiment, the status of the alarm information which is no longer displayed on the alarm information list screen 50 by the filtering (the alarm information excluded from the display target) is not changed even when the collectively-acknowledge button 61 is operated by the operator. In other words, only the alarm information displayed on the alarm information list screen 50 (the alarm information specified as the display target) can collectively be removed from the alarm information list screen 50 by the collectively-acknowledge button 61, among the "unacknowledged but solved" alarm information. This is because there is a possibility that the operator has not yet grasped the alarm information which is not displayed on the alarm information list screen 50, and therefore, it is not preferred to automatically change the status thereof to "acknowledged."

Note that, by utilizing this, the operator can control, with the collectively-acknowledge button 61, a range of the alarm information to be removed from the alarm information list screen 50. For example, when the operator thinks he/she wants to collectively remove only the alarm information of which priority is "Warning" and leaves the "Alarm" alarm information, the operator excludes the alarm information of which priority is "Alarm" once, and operates the collectively-acknowledge button 61 in the state in which only the "Warning" alarm information is specified as the display target. Thus, it can be such that among the "unacknowledged but solved" alarm information, only the status of the alarm information of which priority is "Warning" is changed to "solved" and collectively removed from the alarm information list screen 50. On the other hand, since the status of the "Alarm" alarm information which is "unacknowledged but solved" is not changed, by specifying the priority "Alarm" as the display target again, the alarm information can be displayed on the alarm information list screen 50 again. By operating the collectively-acknowledge button 61 upon specifying the display target as described above, it can be such that only the "unacknowledged but solved" alarm information is collectively removed from the alarm information list screen 50.

As described above, the information display device 10 of this embodiment includes the display unit 21, the alarm information acquiring module 30, the memory 31, the transmission source classification list memory 32, the importance list memory 33, the display target specifying module 34, the information selecting module 35, and the alarm information displaying module 36. The alarm information acquiring module 30 acquires the alarm information from the plurality of apparatuses installed in the ship. The memory 31 stores the acquired alarm information. The transmission source classification list memory 32 stores the transmission source classification lists obtained by associating each apparatus with one of the three kinds of transmission source categories. The importance list memory 33 stores the importance lists obtained by associating each kind of alarm information which can be transmitted from the apparatus with one of the three levels of importance. The display target specifying module 34 specifies all or part of the three kinds of transmission source categories and the three levels of importance as the display target. The information selecting module 35 selects the alarm information corresponding to the display target specified by the display target specifying module 34, from the alarm information stored in the memory 31, based on the transmission source classification lists and the importance lists. The alarm information displaying module 36 displays, on the display unit 21, the alarm information list screen 50 on which only the specified alarm information is displayed as a list.

By only extracting the alarm information specified as the display target and displaying it as a list as described above, the alarm information can be displayed to be eye-friendly.

Although the preferred embodiment of this disclosure is described above, the above configuration may be modified as follows, for example.

In the above embodiment, under the condition that the predetermined time period has passed since the operation of unchecking the check box, the state of the check boxes is returned to the state in which all the check boxes are checked; however, the condition for rechecking the check boxes is not limited to this. For example, the state of the check boxes may be returned to the state in which all the check boxes are checked under a condition that new alarm information is acquired by the alarm information acquiring module 30. According to this, when the new alarm information is acquired, all the six check boxes 66 to 71 become the state in which they are checked; therefore, the newly acquired alarm information is surely displayed on the alarm information list screen 50.

The display target specification interface may not be the check boxes as the embodiment described above, and suitable interface may be adopted. For example, the display target may be specified in a pull down menu. However, the means for specifying the display target is not limited to the graphical interface displayed on the display unit 21, and for example, the operator may control a physical button to specify the display target.

The display target specifying interface is not necessarily be displayed together with the alarm information on the same screen as the alarm information list screen 50, and for example, the display target may be specified on a different option setting screen from the alarm information list screen 50. However, as illustrated in FIG. 2, it is preferable that the display target specifying interface (check boxes) is displayed together with the alarm information on the same screen as the alarm information list screen 50, since the display target can be specified without switching the screen. However, the alarm information and the display target specifying interface are not necessarily displayed on the same screen. For example, a plurality of display units may be provided to the information display device (so-called multi display), the alarm information list screen 50 may be displayed on one of the display units, and simultaneously, the display target specifying interface (check boxes) may be displayed on other display unit. Also this case is preferable since the display target can be specified without switching the screen.

Figure 8:
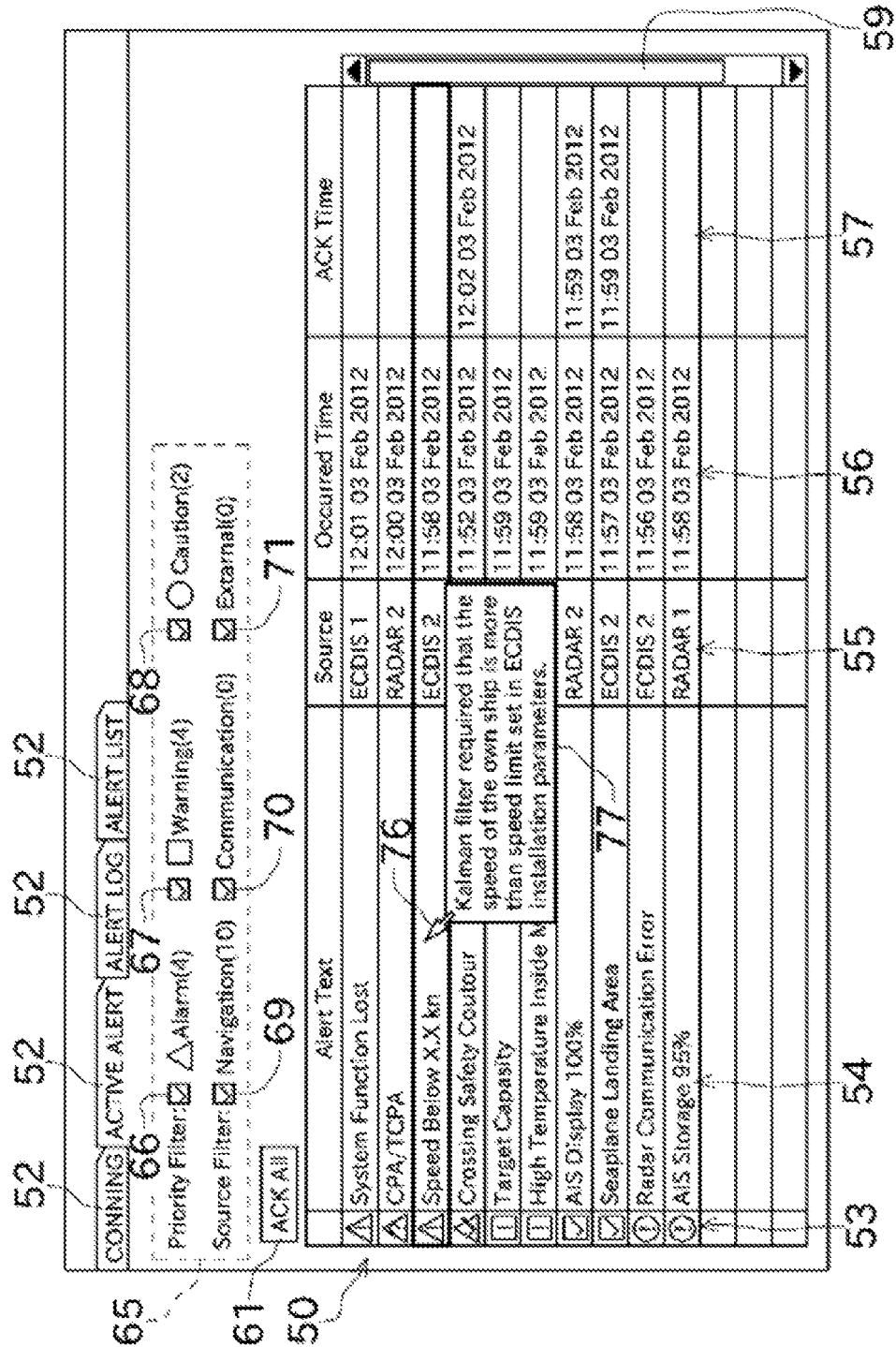
FIG. 8 is a view illustrating a modification of displaying a solution to popup.

In the embodiment described above, the solution display area 60 where the solution is displayed is secured within the same screen as the alarm information list screen 50; however, the display mode of the solution is not limited to this. For example, as illustrated in FIG. 8, when a mouse cursor 76 is hovered over the alarm information displayed on the alarm information list screen 50, the solution of the relevant alarm information may be displayed as a popup display 77. In the case with this configuration, it is not required to always secure the solution display area 60 as FIG. 2, and therefore, a larger area can be secured to display the alarm information.

Although the contents of the importance lists and the transmission source classification lists are illustrated in the alarm list screen 72 in FIG. 7, this alarm list screen 72 is configured to merely display the contents of each list to be easily understood, and it does not display a data structure of the information stored in the importance list memory 33 and the transmission source classification list memory 32. Moreover, in this specification, the reference of "list" regarding the stored contents of the information stored in the importance list memory 33 and the transmission source classification list memory 32 does not indicate a specific data structure, such as a linked list, and simply means that the plurality of kinds of information is stored associated with each other. The data structure of the information stored in the importance list memory 33 and the transmission source classification list memory 32 is not particularly limited and may be any data structure.

The alarm display device according to this disclosure is not limited to be installed in ships, and may be installed in other movable bodies, for example, aircrafts.

DESCRIPTION OF REFERENCE NUMERAL(S)

1 INS (Integrated Navigation System)
10 Information Display Device (Alarm Display Device)
21 Display Unit
30 Alarm Information Acquiring Module
31 Memory
32 Transmission Source Classification List Memory
33 Importance List Memory
34 Display Target Specifying Module 35 Information Selecting Module
36 Alarm Information Displaying Module
50 Alarm Information List Screen
65 Display Target Specifying Check Box Group (Display Target Specifying Interface)

What is claimed is:

1. An alarm display device for installation in a ship, comprising:
  a display unit;
  an alarm information receiver configured to acquire a plurality of sets of alarm information from a plurality of apparatuses installed in the ship;
  a memory configured to store the plurality of acquired sets of alarm information;
  a transmission source classification list memory configured to store transmission source classification lists obtained by associating each apparatus with one of a plurality of transmission source categories;
  an importance list memory configured to store importance lists obtained by associating each set of alarm information that is possibly transmitted from the apparatus, with one of a plurality of levels of importance;
  a display target specifier configured to specify all or part of the plurality of transmission categories and the plurality of levels of importance as a display target;
  an information selector configured to select one or more sets of alarm information corresponding to the display target specified by the display target specifier, from the plurality of sets of alarm information stored in the memory, based on the transmission source classification lists and the importance lists;
  an alarm information display configured to display log list screen displaying previous alert information in a list, an alarm information list screen displaying active alert information in a list, and a tab to switch between the log list screen and the alarm information list screen on the display unit,
  wherein the log list screen displays the one or more selected sets of alarm information selected by the information selector; and
  wherein the log list screen and the alarm information list screen display an alarm content text, a transmission source, an occurred time, and an acknowledged time information in a same order.

2. The alarm display device of claim 1, wherein the display target specifier displays, on the display unit, a display target specifying interface for allowing an operator to specify the all or part of the plurality of transmission source categories and the plurality of levels of importance.

3. The alarm display device of claim 2, wherein the display target specifying interface is displayed on the same screen as the alarm information list screen.

4. The alarm display device of claim 1, wherein the plurality of levels of importance include three levels.

5. The alarm display device of claim 1, wherein the plurality of transmission source categories include three kinds of a navigational electronic apparatus related kind, a communication apparatus related kind, and an engine room related kind.

6. The alarm display device of claim 1, comprising a display resumer configured, after a predetermined period of time from the specification of the part of the plurality of transmission categories and the plurality of levels of importance as the display target, to return the state of the plurality of transmission categories and the plurality of levels of importance to a state in which all the plurality of transmission categories and the plurality of levels of importance are specified as the display target.

7. The alarm display device of claim 2, wherein the number of sets of alarm information specified as the display target by the display target specifying interface is displayed near the display target specifying interface.

8. The alarm display device of claim 1, comprising an acknowledging user interface configured to allow an operator to input that the one or more sets of alarm information displayed on the alarm information list screen are acknowledged,
  wherein the alarm information display removes the set of alarm information that is acknowledged and solved, from the alarm information list screen.

9. The alarm display device of claim 8, comprising:
  a log selector configured to select the one or more sets of alarm information corresponding to the specified display target, from a plurality of sets of previous alarm information that are acknowledged and solved; and
  a log display configured to display, on the display unit, a log list screen displaying only the selected one or more sets of previous alarm information in a list.

10. The alarm display device of claim 8, comprising a collective acknowledging user interface configured, when a plurality of sets of alarm information that are unacknowledged but solved exist, to allow the operator to collectively acknowledge the plurality of sets of solved alarm information.

11. The alarm display device of claim 1, comprising a solution display configured, when the set of alarm information is specified by predetermined operation of an operator, to display a solution of the set of alarm information on the display unit.

12. The alarm display device of claim 11, wherein solution display icons are associated with the respective sets of alarm information and displayed on the alarm information list screen, and
  wherein when the operator operates the solution display icon, the solution display displays a solution of the alarm information corresponding to the icon.

13. The alarm display device of claim 11, wherein the solution display displays the solution within the same screen as the alarm information list screen, in a predetermined area different from an area where the one or more sets of alarm information are displayed.

14. The alarm display device of claim 11, wherein the solution display displays the solution to popup.

15. The alarm display device of claim 1, comprising a conning information display configured to display, on the display unit, a conning screen displaying at least a propulsion state of the movable body, and
  wherein the conning information display displays, in a partial area of the conning screen, the one or more sets of the alarm information that are sorted under a predetermined sorting condition fixedly determined, preferentially from the alarm information at the top in the sorted order.

16. The alarm display device of claim 15, wherein the sorting condition used by the conning information display is the order from the most important alarm information and the alarm information with the latest occurred time.

17. An integrated navigation system, comprising:
  the alarm display device of claim 1;
  a radar; and
  an ECDIS (Electronic Chart Display and Information System).

18. A method of displaying alarms for installation in a ship, comprising:
- acquiring a plurality of sets of alarm information from a plurality of apparatuses installed in the ship;
- storing the plurality of acquired sets of alarm information;
- storing transmission source classification lists obtained by associating each apparatus with one of a plurality of transmission source categories;
- storing importance lists obtained by associating each set of alarm information that is possibly transmitted from the apparatus, with one of a plurality of levels of importance;
- specifying all or part of the plurality of transmission categories and the plurality of levels of importance as a display target;
- selecting one or more sets of alarm information corresponding to the display target specified by the specifying the all or part, from the plurality of sets of alarm information stored by the storing the plurality of acquired sets of alarm information, based on the transmission source classification lists and the importance lists;
- displaying a log list screen displaying previous alert information in a list, an alarm information list screen displaying active alert information in a list, and a tab to switch between the log list screen and the alarm information list screen on a display unit,
- wherein the log list screen displays the one or more selected sets of alarm information by the selecting; and
- wherein the log list screen and the alarm information screen display an alarm content text, a transmission source, an occurred time, and an acknowledged time information in a same order.

19. The method of displaying the alarms of claim 18, wherein the plurality of levels of importance include three levels.

20. The method of displaying the alarms of claim 18, wherein the plurality of transmission source categories include three kinds of a navigational electronic apparatus related kind, a communication apparatus related kind, and an engine room related kind.

* * * * *